(12) United States Patent
Todd et al.

(10) Patent No.: US 7,302,416 B2
(45) Date of Patent: Nov. 27, 2007

(54) GENETIC OPTIMIZATION COMPUTER SYSTEM

(75) Inventors: Peter James Todd, Winchester (GB); Stephen Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/366,698

(22) Filed: Mar. 2, 2006

(65) Prior Publication Data
US 2006/0224536 A1    Oct. 5, 2006

(30) Foreign Application Priority Data
Mar. 2, 2005    (GB) .................................. 0504389.8

(51) Int. Cl.
*G06F 15/18*    (2006.01)
*G06N 5/00*    (2006.01)

(52) U.S. Cl. .......................................... 706/13; 706/45

(58) Field of Classification Search .................. 706/13, 706/12, 45
See application file for complete search history.

(56) References Cited

U.S. PATENT DOCUMENTS

| | | | | |
|---|---|---|---|---|
| 4,697,242 A | * | 9/1987 | Holland et al. ................ | 706/13 |
| 4,881,178 A | * | 11/1989 | Holland et al. ................ | 706/12 |
| 4,935,877 A | * | 6/1990 | Koza ............................ | 706/13 |
| 5,222,192 A | * | 6/1993 | Shaefer ....................... | 706/13 |
| 5,255,345 A | * | 10/1993 | Shaefer ....................... | 706/13 |
| 5,343,554 A | * | 8/1994 | Koza et al. ................... | 706/13 |
| 2003/0004904 A1 | | 1/2003 | Kirshenbaum ............... | 706/13 |
| 2004/0081977 A1 | | 4/2004 | Hsu et al. ..................... | 435/6 |

\* cited by examiner

*Primary Examiner*—Wilbert L Starks, Jr.
(74) *Attorney, Agent, or Firm*—Duke W. Yee; Herman Rodriguez; Wayne P. Bailey (57) ABSTRACT

A genetic optimization computer system comprises a model and an optimizer. The model defines the structure of a candidate solution to a problem as a plurality of objects in combination (A,B,C). The objects consist of defined parameters (x,y). The model also runs potential solutions to the problem and generates an output. The optimizer stores potential solution candidates and crosses pairs of them to produce new child solution candidates which are run by the model. The child solutions are evaluated on the basis of the model output and their fitness for purpose indicated, and identified to the optimizer. The model also defines at least one group of objects which are identically structured and equivalent to each other. By associating each object of the defined group from one solution candidate with an object of the defined group from another solution candidate so as to minimize the difference between the respective groups prior to crossing the candidates, a faster convergence towards an optimum solution is achieved.

14 Claims, 4 Drawing Sheets

GENETIC OPTIMIZATION COMPUTER SYSTEM

FIELD OF THE INVENTION

The invention relates to the use of genetic optimization methods in computer systems.

BACKGROUND OF THE INVENTION

The technique of genetic optimization is well known for enabling computerised generation of an optimum solution to a problem by selection from a pool of candidates in a manner analogous to natural genetic selection. A model creates outputs in response to inputs defining potential solutions, which outputs are evaluated against it for fitness until an optimum solution is found or a cut off point is reached. The structure of the candidate solutions is defined in the model as a string of parameters representing different properties of the solution. Each specific solution is an instance of the general structure in which specific values are ascribed to the parameters. The process of optimization involves generation of new candidate solutions from the original pool of candidates followed by subsequent iterative generation of further solutions from the modified pool. Poor solutions, as determined by the fitness evaluation are rejected and better solutions selected for the pool.

Thus the candidate solutions may be thought of as analogous to individual or multiple chromosomes and the parameters to genes of living organisms. In order to generate further candidate solutions, crossing techniques analogous to cross breeding are employed whereby portions of two solutions (parents) are combined to form a new solution (child), still meeting the overall structure. This operation is known as a crossover operation. Several types of crossover are possible depending on rules defining exactly how portions of candidate solutions may be combined. A simple example would be where the first half portion of one candidate solution was combined with the second half portion of another candidate solution. Clearly many other ways of combining and rearranging the parameter values of two solutions are possible.

Also known is a mutation operation whereby a defined proportion of the candidate solutions have individual or multiple parameter values changed. This could be done, for example, by means of a random number generator. This is analogous to natural mutation of the genes of living organisms.

Figure 1:
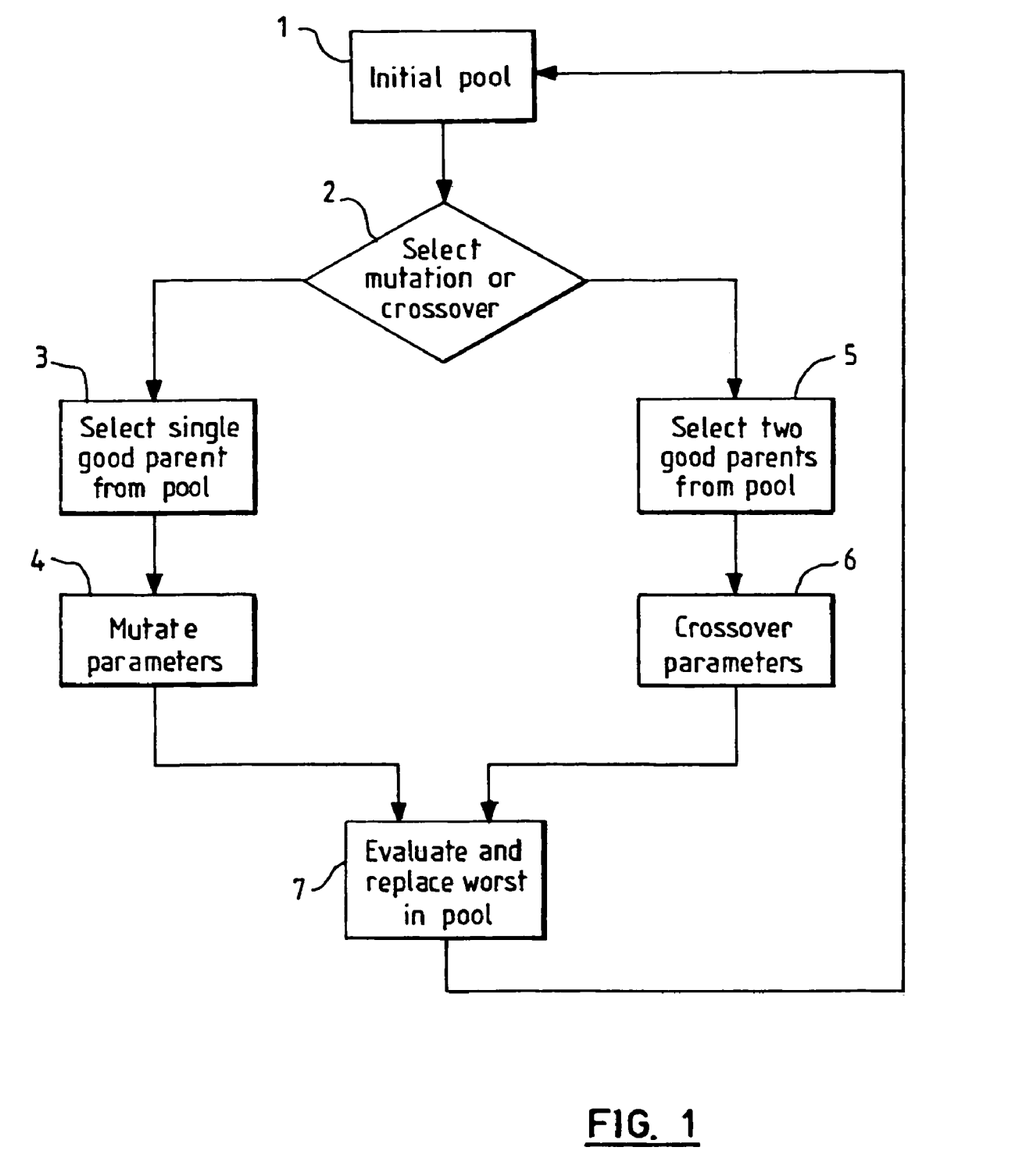
FIG. 1 is a flow diagram illustrating conventional crossover and mutation.

Such a known system is illustrated in the flow diagram of FIG. 1 in which candidates from an initial pool 1 are selected for mutation or crossover in decision box 2. In the case of mutation, a single parent, already judged to be promising, is selected at step 3 and its parameters mutated in step 4. In the case of crossover, two promising parents are selected at step 5 and their parameters crossed in step 6. The resulting new candidates are evaluated in step 7 and, if adjudged to be improvements, are fed back to the pool 1, replacing the inferior candidates, and are available for further crossing or mutation.

Clearly, such genetic optimization techniques are extremely demanding of computing time and resources, depending on the number of candidates to be considered and mutated or crossed and on the number of iterations employed in arriving at, if not the optimum, at least an acceptable solution.

Various approaches have been tried in the prior art in attempting to minimize the time and resources needed to reach an optimum acceptable solution. These can involve altering the rules for crossover or mutation, for evaluating fitness for purpose and limiting the number of iterations carried out.

One example of a technique for increasing the efficiency of a genetic algorithm applied to computer programming is described in US Patent Application Publication 2003/004904 A1 entitled "Multi-Module Genetic Programming with Multiple Genetic Data Representations"This employs multiple genetic data component representations for different modules of the solution. Each module is characterised by a "model" and realised by referring to one or more of the genetic data components. Evolution of a solution by using crossover operations is made more efficient by matching the genetic data component representations before crossover so that like component representations are crossed rather than ones of different type.

Another example of an attempt to improve efficiency is described in US Patent Application Publication 2004/0081977 A1 entitled "Genetic Algorithm Convergence Accelerating Apparatus, System and Method for the same-"This uses a pipelining technique to speed up the processing of crossover operations, a technique referred to as "hyper-generation crossover"It is claimed that convergence is faster and the solution is closer to the optimal than with conventional techniques.

Neither of these documents addresses the special situation of optimization of a solution where a model defines the structure of the solution or goal to be achieved as a group of objects (A,B,C) in combination, the objects consisting of defined parameters and being identically structured. Such a group may also be thought of as a defined set of submodels. Conventionally, two candidate solutions each including an identically structured group, say, A1, B1 and C1 and A2, B2 and C2 might be crossed in sequence or by name, thus: A1 with A2, B1 with B2 and C1 with C2. This would produce a relatively random group of children not necessarily converging towards an optimum solution and, in general, it has been found that crossover does not work well in this scenario.

DISCLOSURE OF THE INVENTION

The present invention is based on the realisation that, in addition to their identical structure, the objects A, B and C constituting the various groups may in certain situations be considered as equivalent and more efficient convergence towards the optimum may be achieved if objects from such groups are selected on the basis of their closeness, as determined from their parameters, rather than on the basis of their names or their order of occurrence.

Accordingly the invention provides a genetic optimization computer system comprising: a model defining the structure of a candidate solution to a problem as a plurality of objects in combination, the objects consisting of defined parameters, the model further including means to run potential solutions to the problem and to generate an output; an optimizer including a store for storing a plurality of potential solution candidates to the problem, which solution candidates are combinations of object instances having specific values substituted for parameters; means for crossing a parent pair of solution candidates to produce a new child solution candidate; and means for inputting the new child solution candidate to the model in order for the model to run the child solution candidate and generate said model output; the system further including fitness indicating means for indicating on the basis of the model output the relative fitness for purpose of the child solution candidate and means responsive thereto for identifying relatively fitter child solution to the optimizer; wherein the model further defines at least one group of objects to be identically structured and equivalent to each other and the optimizer further includes means for associating each object of the defined group from one solution candidate with an object of the defined group from another solution candidate so as to minimize the difference between the objects of the respective groups prior to crossing of the solution candidates.

According to another aspect, the invention also provides a method of genetic optimization for implementation in a computer system, which system comprises a stored model defining the structure of a candidate solution to a problem as a plurality of objects in combination, the objects consisting of defined parameters, the model further including means to run potential solutions to the problem and to generate an output; and a solution store for storing a plurality of potential solution candidates, which solution candidates are combinations of object instances having specific values substituted for parameters; the method comprising the steps of: crossing a parent pair of solution candidates to produce a new child solution candidate; running the child solution candidate in the model to generate said model output; indicating on the basis of the model output the relative fitness for purpose of the child solution candidate; and identifying relatively fitter child solution candidates for storage in the solution store; wherein the model further defines at least one group of objects to be identically structured and equivalent to each other and the method includes the further step of: prior to the crossing of the parent pair of solution candidates, associating each object of the defined group from one solution candidate with an object of the defined group from another solution candidate so as to minimize the difference between the objects of the respective groups.

The invention also provides a computer program for implementing this method.

The underlying assumption is that a better solution will result from the crossing of two already partly optimized candidates which are closer together than from two which are further apart. A calculation is made of a defined representation of the difference between each possible combination of parameters of the objects of the respective groups in order to select the association having the minimum difference.

A preferred calculation method selects pairs of objects for association iteratively in order of their calculated closeness. Where the defined parameters of the defined group are numeric, closeness may be calculated by determining the squares of the difference in values of like parameters.

The fitness indication as well may also be calculated quantitatively from the model output. This would be appropriate where the goal may be quantitatively expressed, for example, as a maximised profit and the model is a company or companies or, for example, as a minimum achievable energy usage in a factory or building complex.

Not all goals and solutions for which the present invention is useful are susceptible of mathematical representation and calculation for the purpose of fitness evaluation. For example, problems involving interactive human judgement of a qualitative kind can use genetic optimization. Examples might be optimization of musical arrangement or recognition of a face from stored picture components. However, there must be some way of coding solutions in such a manner that the distance between them can be numerically computed.

It is not critical to the invention precisely where or by what means the fitness indication is determined. This may be done within or separately from the model and the fitness indication produced accordingly. The fitness indication may be used to control both the promotion of superior solution candidates held in the optimizer store and the deletion of inferior candidates.

BRIEF DESCRIPTION OF THE DRAWINGS

The invention will now be described, by way of example only, with reference to a preferred embodiment thereof, as illustrated in the accompanying drawings, in which.

DETAILED DESCRIPTION OF THE INVENTION

Figure 2:
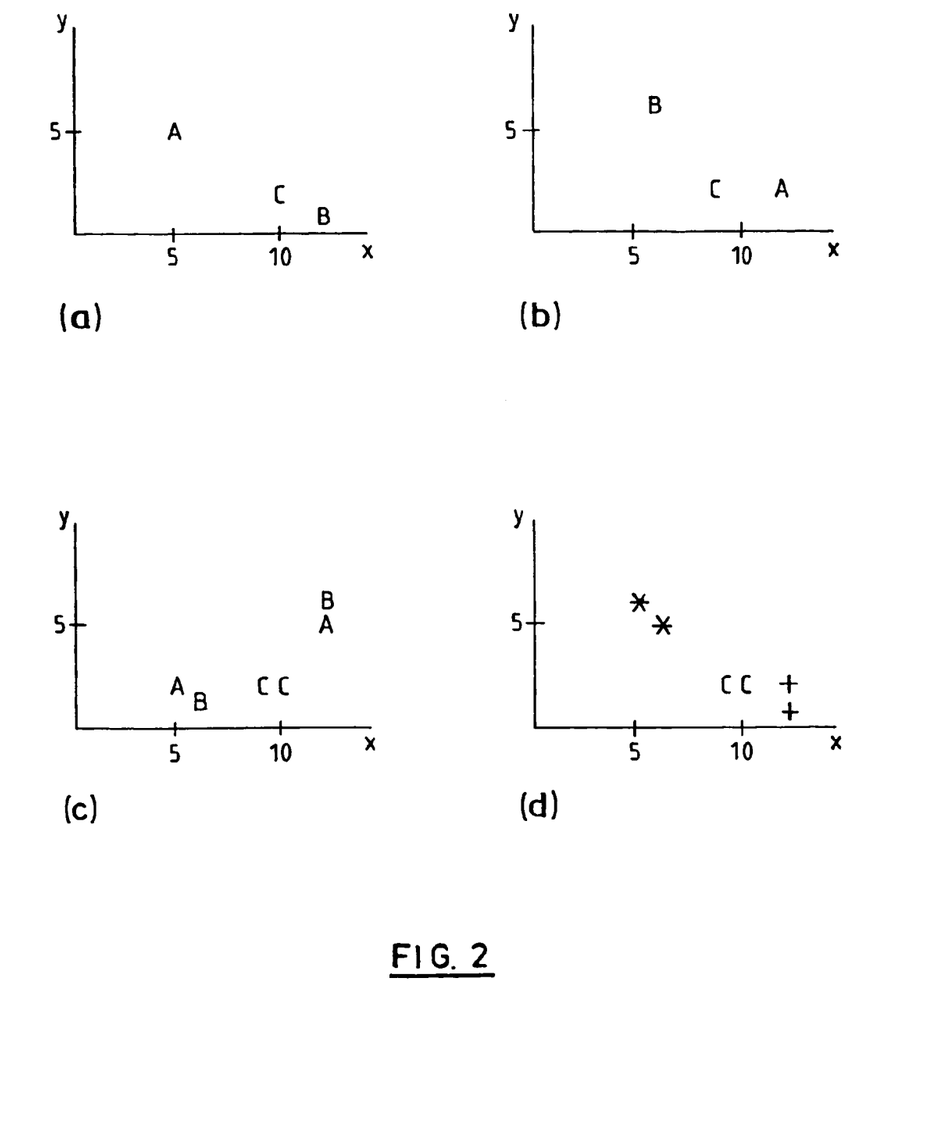
FIG. 2 is a graphical illustrative example of crossing a pair of candidate solutions having a common group structure by employing an optimization system and method according to the invention.

In order to describe the principles behind the invention, reference is made to FIG. 2 in which a very simple example of genetic optimization employing crossover is illustrated, firstly, according to the prior art and, secondly, according to the invention. It is assumed that the candidate solutions are each composed of three objects named A, B and C, each of which can have two parameters (genes) x and y. The basic structure of the individual objects is thus the same, though the parameter values will, of course, be different.

FIGS. 2(a) and 2(b) represent two possible candidate solutions having different sets of x and y values for their respective objects A, B and C. These may also be represented in table form as follows:

TABLE 1

|  | FIG. 2(a) | FIG. 2(b) |
| --- | --- | --- |
| $A_x$ | 5 | 12 |
| $A_y$ | 5 | 2 |
| $B_x$ | 12 | 6 |
| $B_y$ | 1 | 6 |
| $C_x$ | 10 | 9 |
| $C_y$ | 2 | 2 |

Applying a conventional crossover to the two solutions, objects with the same name would be crossed to produce child solutions taking the x value from one object and the y value from the other object. In the example, this would produce solutions illustrated by FIG. 2(c), giving two possibilities for the result of each crossing of A, B and C respectively.

It can be seen that, because the objects A and B were far apart in value in FIGS. 2(a) and (b), the two possible results of crossing the objects A are also far apart from each other and from the parents A. Similarly, the two possible results for objects B are also far apart from each other and the parents B. This means that the child solutions they represent are very different. Only in the case of objects C, which were close together will the crossing solutions be near to the parents and to each other.

A conventional system may also permit 'trivial' crossover situations for object A, where both values are taken from the same parent, and so the crossed-over A is the same as one of the parent As. The overall crossover may still be non-trivial, for example if BOTH parameters from A are taken from the first parent and BOTH parameters for B from the second parent. To avoid confusion and clutter, we have not considered these cases in the sample diagrams.

As an optimization process proceeds, child solutions can be expected gradually to converge towards an optimum. In the intermediate stages of the process, it is therefore more likely that crossing the children of similar parents will speed the process of convergence towards the optimum solution, as compared with crossing very different parents.

The present invention depends on the recognition that component objects of the solution, such as A, B and C in the example of FIG. 2 form a group of identically structured objects which are defined by the model to be completely equivalent to each other for the purposes of crossover. The only difference is in their names and the sequence in which they may appear in a candidate solution. It can therefore be advantageous to consider which members of the corresponding groups of two candidate solutions are in fact the closest together in value, irrespective of their names or positions in the sequence and to cross objects with those closest in value. Note that the concept and definition of 'complete equivalence' of groups must be stated in the model.

As applied to the example of FIG. 2, object A from FIG. 2(a) is in fact closest to object B from FIG. 2(b) and object B from FIG. 2(a) is in fact closest to object A from FIG. 2(b). By associating these objects accordingly, as permitted by the model, and then crossing them while leaving the crossing of objects C, which are closest in value, unaltered, the possible child solutions illustrated in FIG. 2(d) are produced. It can be seen that these are much closer to each other and to previously selected parents than was the case in FIG. 2(c). The A,B crossing possibilities are represented by asterisks and the B,A crossing possibilities by plus signs.

Thus, in summary, where a model of the solution defines grouped objects, crossover is performed in two stages:

1) the best possible correspondence or alignment between objects is determined so as to associate pairs of objects;

2) crossover is performed on the associated pairs of objects.

A preferred implementation of the invention will now be described with reference to FIGS. 3 to 6.

Figure 3:
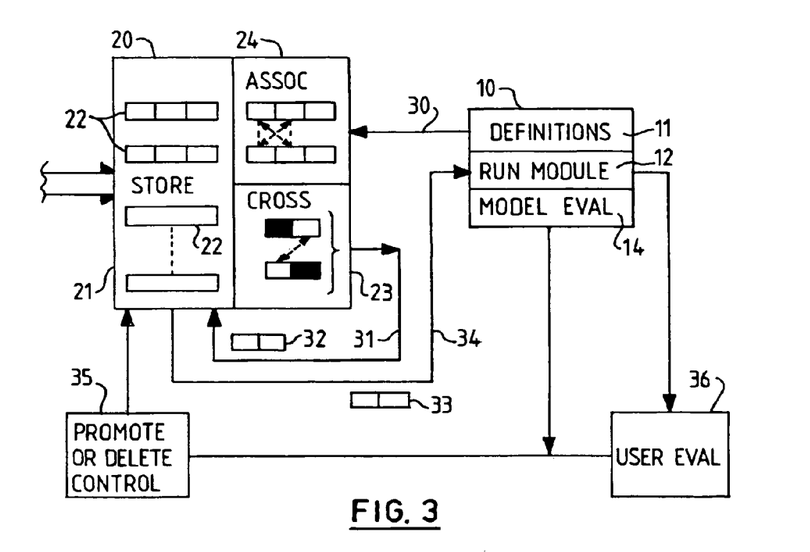
FIG. 3 shows an optimization system according to the invention.

In FIG. 3, a genetic optimization system is illustrated which consists of two major components, a model 10 and an optimizer 20. The model contains definitions 11 of the goal or target solution structure, for example, of the objects making up the solution in terms of their names, formats, data types and value ranges. In the present case, these definitions also include recognition of the equivalence of grouped objects having identical data types. These definitions are made available over connection 30 to the optimizer to use in the production of solutions according to a genetic algorithm.

The optimizer includes a store 21, which is initially loaded with a population of candidate solutions 22. These may be randomly generated but must, of course, comply in format with the model definitions. The optimizer selects pairs of candidate solutions for genetic operations such as mutation and crossover in a crossover module 23 to produce child solutions. These aspects are conventional and will not be described further.

Also conventionally, the child solutions 32 from, for example, crossover module 23 are fed back over connection 31 to the store 22. If deemed fit for optimization purposes, as explained further below, crossed solution candidates 33, selected from candidates 32 in the store, are applied over connection 34 to a run module 12 forming part of the model. The run module applies or executes the fed back solutions and produces a test output which is the expression of the candidate solution, analogous to a phenotype in genetic terms. Where the test output from the run module 12 is numerical or otherwise machine readable, the model also includes a fitness evaluation module 14 which determines on the basis of predefined criteria, related to the solution or goal to be achieved, the relative fitness for purpose of the currently tested solution 33. This indication is passed to a Promote/Delete controller 35 which either promotes the solution 33 in the store or deletes it, depending on the evaluation result. If promoting the solution, the Promote/Delete controller replaces the worst solution currently in the store with the new solution 33.

Although many optimization problems which can benefit from genetic algorithm techniques are capable of quantitative expression, such as a maximum profit figure or minimum energy consumption configuration, the technique is also useful where fitness is judged subjectively and indicated by the interactive input of a human user. This is illustrated in FIG. 3 by the alternative user fitness evaluation decision box 36, the output from which determines whether an applied solution on line 34 is promoted or deleted by controller 35. In this variant, the expressed form of the candidate solution, produced directly by the run module 12, is manifested directly to the human user.

FIG. 4(a) shows a pair of grouped candidate solutions 22, each comprising a group of objects A1B1C1 and A2B2C2 which may be selected by the optimizer 20. Each object has two components, an x and a y component, shown as $A1_x$, $A1_y$ etcetera. The optimizer must recognise the grouped nature of the candidate solutions on the basis of the supplied model definitions.

The two grouped candidate solutions are applied to an association module 24 which determines the best correspondence between the groups to minimize the distance between them, in a manner to be described below, and realigns them for crossover if appropriate. As shown in FIG. 4(b) and as was the case in the example of FIG. 2, group A1 is aligned with group B2 and group B1 with group A2. Crossover module 23 then crosses each of the three groups in turn to produce the child solution shown in FIG. 4(c). As can be seen, the left hand group is formed of $A1_x$ and $B2_y$, the middle group of $B1_x$ and $A2_y$ and the right hand group of $C1_x$ and $C2_y$.

Figure 4:
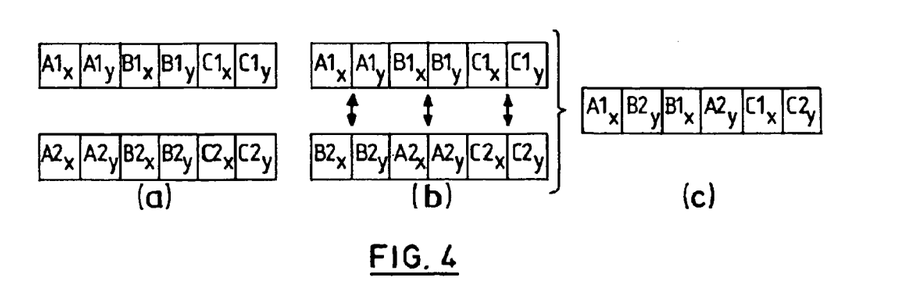
FIG. 4 shows two parent candidate solutions having a common group structure before and after realignment for crossover and the resulting child solution produced by the system of FIG. 2.
Figure 5:
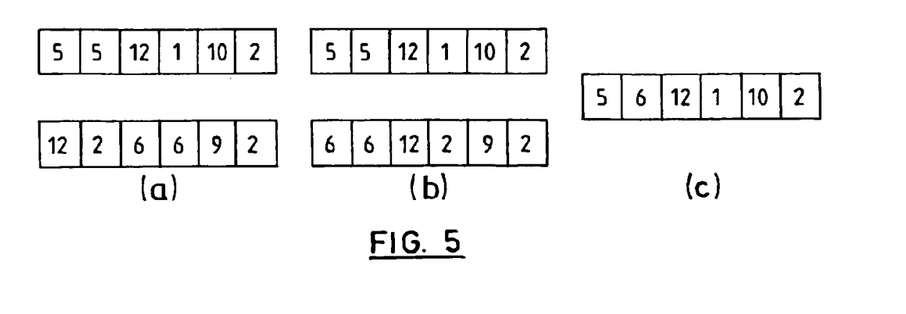
FIG. 5 shows the solution of FIG. 4 with substitution of actual numerical values corresponding to the example of FIG. 2.

FIG. 5 shows the same associated and crossed groups as FIG. 4 but with explicit parameter values from the earlier example of FIG. 2.

Figure 6:
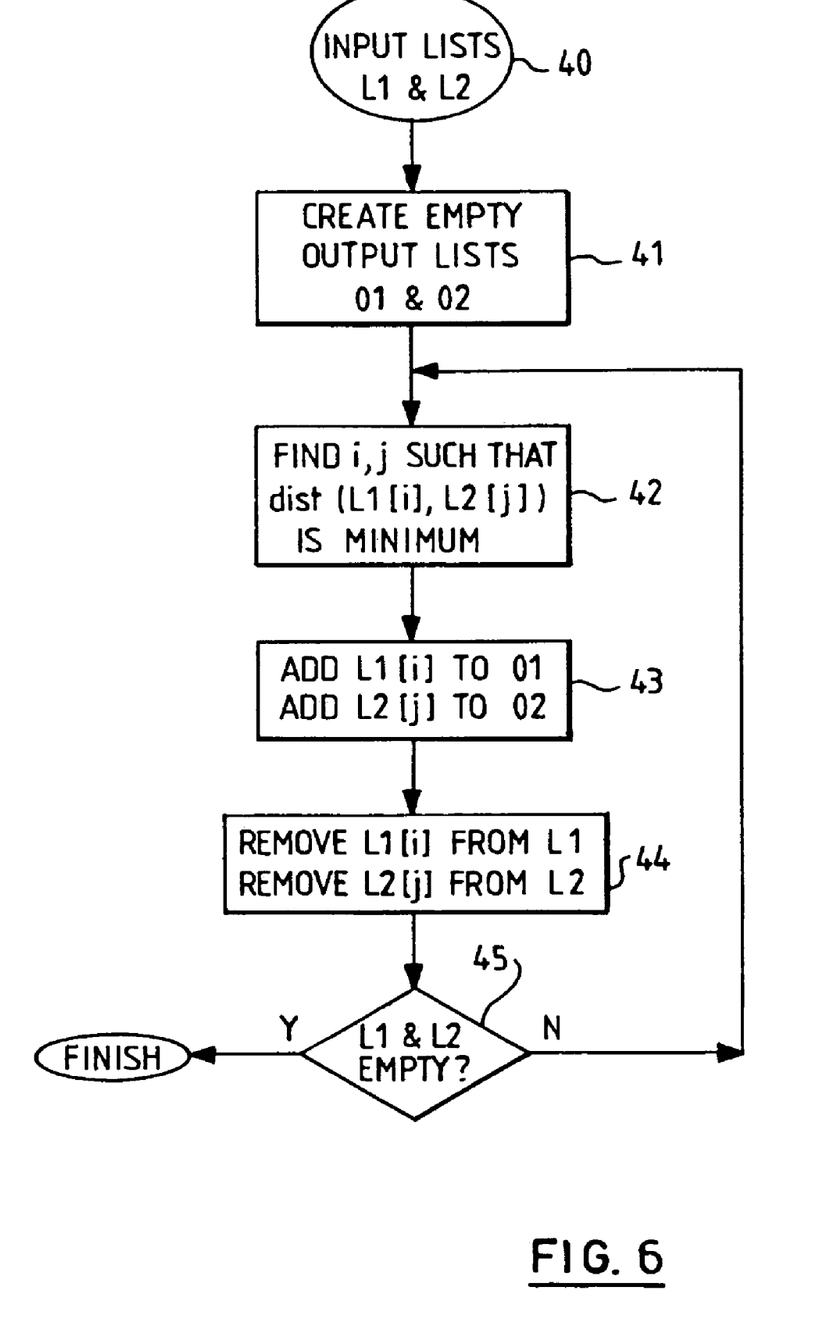
FIG. 6 is a flow diagram of a method of aligning the groups of a pair of candidate solutions for crossover in the system of FIG. 3.

A closeness algorithm for determining correspondence between groups in the system of FIG. 3 and for the simple example of FIGS. 2 and 5 will now be described with reference to FIG. 6. The algorithm may be simply expressed as:

(a) first find the closest pair of objects in the two parents;
(b) make them correspond;

(c) remove corresponding objects from list of objects to correspond;

(d) repeat on remaining objects not yet assigned corresponding pair until all objects assigned a correspondent.

While this process is not guaranteed to give the very best association of objects for overall closeness, it is computationally simple and adequate for purpose. A more exhaustive search could be used if preferred.

The process starts with the step 40 of converting the two candidates to be aligned into input lists L1 and L2, which are simply sequential lists of the values of the parameters of the groups making up the solution. The next step 41 is to create two empty output lists O1 and O2, where the realigned solutions will be built. This is as shown in Table 2, similar to Table 1 above:

TABLE 2

| i, j | | List 1 | List 2 | O1 | O2 |
|---|---|---|---|---|---|
| 1 | $A_x$ | 5 | 12 | | |
|   | $A_y$ | 5 | 2  | | |
| 2 | $B_x$ | 12 | 6 | | |
|   | $B_y$ | 1  | 6 | | |
| 3 | $C_x$ | 10 | 9 | | |
|   | $C_y$ | 2  | 2 | | |

Then the lists are examined in step 42 to find the groups i and j in lists L1 and L2 such that the distance between them is the minimum. This may be done generally by calculating the standard geometric distance $[\sqrt{(x_1-x_2)^2+(y_1-y_2)^2}]$ between the groups but, as can be seen by inspection, the closest pair in the above example is the second pair, $B_x$ and $B_y$, from List 1 and the first pair, $A_x$ and $A_y$, from List 2 Thus i=2 and j=1.

The entry L1[i] is added to O1 and the entry L2[j] is added to O2 in step 43 and the same entries are removed from L1 and L2 in step 44.

The lists L1 and L2 now contain:

TABLE 3

| i, j | L1 | L2 | O1 | O2 |
|---|---|---|---|---|
| 1 | 5  | 6 | 12 | 12 |
|   | 5  | 6 | 1  | 2  |
| 2 | 10 | 9 |    |    |
|   | 2  | 2 |    |    |

In Table 3 the group names are omitted as they no longer have meaning—they are equivalent and do not affect the alignment process.

The result (by calculation or inspection) of Table 3 is that i=2 and j=2 gives the closest match and these paired values 10,2 and 9,2 are added to the output lists and removed from the input lists.

TABLE 4

| i, j | L1 | L2 | O1 | O2 |
|---|---|---|---|---|
| 1 | 5 | 6 | 12 | 12 |
|   | 5 | 6 | 1  | 2  |
| 2 |   |   | 10 | 9  |
|   |   |   | 2  | 2  |

This leaves only the pairs 5,5 and 6,6 left and these are added to the output lists to complete the process, as determined by test step 45 to determine that the input lists are now empty.

The output lists O1 and O2 now contain the aligned group values as follows:

TABLE 5

| i, j | L1 | L2 | O1 | O2 |
|---|---|---|---|---|
| 1 |   |   | 12 | 12 |
|   |   |   | 1  | 2  |
| 2 |   |   | 10 | 9  |
|   |   |   | 2  | 2  |
| 3 |   |   | 5  | 6  |
|   |   |   | 5  | 6  |

The simple two dimensional example described above may be generalised for multiply dimensional cases, that is, where the objects have more than two parameters.

In other scenarios, the dimensions may not all have similar scales, so the distance formula needs to be modified to scale each dimension. The scale may be derived in various ways, for example, (a) definition in the model, (b) current scale being used for other aspects of optimization, or (c), range or standard deviation of that parameter (gene) in the current objects.

As an example of (b), a different model has parameters speed (mph in range 0-100) and weight (kg in range 1-10000). The model might define changes of 1 mph as approximately equivalent to changes of 100 kg; such scaling is used in prior art optimizations. In some cases the ratio of scales is dynamically modified as part of the optimization process.

Now having described one simple general form of optimization system according to the present invention, two practical examples in which it may be employed will be described.

Sales Team Modelling

In a scenario where multiple sales teams A,B and C focus on different areas, the problem of maximising predicted sales or revenue is susceptible to a genetic algorithm approach. The objective is defined in the model. The multiple sales teams each have the following "genes" or properties:

1) team size—number of people in team;
2) area_X—one aspect of market area;
3) area_Y—another aspect of market area;
4) focus—degree to which team concentrates on a very narrow area.

There are thus 12 genes in the model of four different types. Since the teams are identical in structure, it does not matter which group is labelled A, B or C. When crossing pairs of candidate solutions, the best child solution is produced by crossing groups which are the closest whether or not they have the same name. This example is clearly quantifiable or codeable in a way which permits the fitness evaluation and indication to be automated.

Automated Musical Composition

Consider several voices A,B,C and D defined in an algorithmic musical composition. The "genes" or properties of each voice define various details of both the tune and the voice tone employed:

1) base_pitch;
2) pitch_variation;
3) base_speed;
4) note_length_variation;
5) harmonic_falloff;
6) attack;
7) decay;

8) sustain;

9) release.

In this case there are 36 genes in the model of nine different types. This scenario, too, is susceptible to optimization by means of a genetic algorithm and system according to the invention but with the difference that the fitness evaluation is subjective and relies on input from a listening user. Apart from this, the same principles apply, namely that in crossing candidate solutions ABCD, the names of the individual voices do not matter as, in structure, they are equivalent. It is therefore advantageous to compare the four voices from one candidate with whichever are the closest in the other candidate. In this way, the optimum composition is most quickly found.

Extensions to Simple Model

In certain cases, the distance measurement and crossover is more complicated and partly embedded in aspects of the model.

For example, where a position is expressed in terms of [a] dist, distance from origin (range around 0 20) and [b] dir, direction (relative say to x axis) (in degrees, typically 0-360). In this case the model 'knows' that the angle can wrap, so that {dist=9, angle=1} is very close to {dist=9, angle=359}The techniques described above may be modified so that the distance measure for each group allows for this 'special' wrapping case. Technically, this involves moving part of the responsibility for distance measurement from the optimizing component into the model but does not substantively change the process described.

In other cases, the definition of crossover itself may also be defined within the model. For example, the parameters {a,b,c,d} of a group may represent a quaternion, with the constraint that a*a+b*b+c*c+d*d=1Simple crossover will not maintain the constraint; for example simple crossover of {1,0,0,0} with {0,1,0,0} may give {1,1,0,0} or {0,0,0,0} which both break the constraint. However, as the model knows the constraint, it can apply corrective measures; for example to correct {1,1,0,0} to {1/sqrt(2),1/sqrt(2),0,0}; and to reject {0,0,0,0} altogether.

The invention claimed is:

1. A genetic optimization computer system apparatus for enabling computerized generation of an optimum solution to a problem, the computer system apparatus comprising:

a model defining the structure of a candidate solution to a problem as a plurality of objects in combination, the objects consisting of defined parameters, the model further including means to run potential solutions to the problem and to generate an output;

an optimizer including a data store means for storing a plurality of potential solution candidates to the problem, wherein solution candidates are combinations of object instances having specific values substituted for parameters; means for crossing a parent pair of solution candidates to produce a new child solution candidate; and means for inputting the new child solution candidate to the model in order for the model to run the child solution candidate and generate said model output;

the computer system apparatus further including fitness indicating means for indicating on the basis of the model output the relative fitness for purpose of the child solution candidate and means responsive thereto for identifying relatively fitter child solution to the optimizer, wherein the means for identifying relatively fitter child solutions to the optimizer is part of an optimizer control means which, responsive to the fitness indication, updates the optimizer data store means by promoting fitter solutions and deleting inferior solutions that are stored in the optimizer data store means;

wherein the model further defines at least one group of objects to be identically structured and equivalent to each other and the optimizer further includes means for associating each object of the defined group from one solution candidate with an object of the defined group from another solution candidate to minimize the difference between the objects of the respective groups prior to crossing of the solution candidates.

2. A computer system apparatus as claimed in claim 1 wherein the defined parameters of the defined group are numeric and the means for associating objects is arranged to calculate a defined representation of said difference between each possible combination of parameters of the objects of the respective groups in order to select the association having the minimum difference.

3. A computer system apparatus as claimed in claim 2 wherein the means for associating objects is arranged to select pairs of objects for association iteratively in order of their calculated closeness.

4. A computer system apparatus as claimed in claim 2 wherein the calculation involves determining the squares of the difference in value of like parameters.

5. A computer system apparatus as claimed in claim 1 wherein the fitness indicating means is part of a fitness evaluation means arranged to calculate the fitness indication quantitatively from the model output.

6. A computer system apparatus as claimed in claim 5 wherein the fitness evaluation means is part of the model.

7. A computer system apparatus as claimed in claim 1 wherein the fitness indicating means includes interactive input means for receiving a user generated indication of fitness in response to the model output.

8. A computer system implemented method of genetic optimization for enabling computerized generation of an optimum solution to a problem, where the computer system comprises a stored model stored in a data storage of the computer system that defines a structure of a candidate solution to the problem as a plurality of objects in combination, the objects comprising defined parameters, the model further including means to run potential solutions to the problem and to generate an output; and a solution data store of the computer system for storing a plurality of potential solution candidates, where the solution candidates are combinations of object instances having specific values substituted for parameters;

the computer system implemented method comprising the steps of:

crossing a parent pair of solution candidates to produce a new child solution candidate;

running the child solution candidate in the model to generate said model output;

indicating on the basis of the model output the relative fitness for purpose of the child solution candidate;

identifying relatively fitter child solution candidates for storage in the solution store;

promoting fitter solutions stored in the solution data store, and deleting inferior solutions from the solution data store, in dependence on the relative fitness indication;

manifesting the model output directly to a human user; and receiving, from the human user, an interactive user generated indication of fitness in response to the model output;

wherein the model further defines at least one group of objects to be identically structured and equivalent to each other and the computer system implemented method includes the further step of:

prior to the crossing of the parent pair of solution candidates, associating each object of the defined group from one solution candidate with an object of the defined group from another solution candidate to minimize the difference between the objects of the respective groups.

9. A method as claimed in claim 8 wherein the defined parameters of the defined group are numeric and wherein the step of associating objects includes calculating a defined representation of said difference between each possible combination of parameters of the objects of the respective groups and using the calculated differences to select the association having the minimum difference.

10. A method as claimed in claim 9 including the step of selecting pairs of objects for association iteratively in order of their calculated closeness.

11. A method as claimed in claim 9 wherein the calculating step involves determining the squares of the difference in value of like parameters.

12. A method as claimed in claim 8 including the step of receiving an interactive user generated indication of fitness in response to the model output that is directly manifested to the human user.

13. A method as claimed in claim 8 including the step of calculating the fitness indication quantitatively from the model output.

14. A computer program comprising computer instructions which, when executed by a computer system, cause the computer system to carry out the steps of the method as claimed in claim 8.

* * * * *